May 5, 1931.   T. LIDBERG   1,803,629
THERMOSTATIC TEMPERATURE CONTROL
Filed March 10, 1927
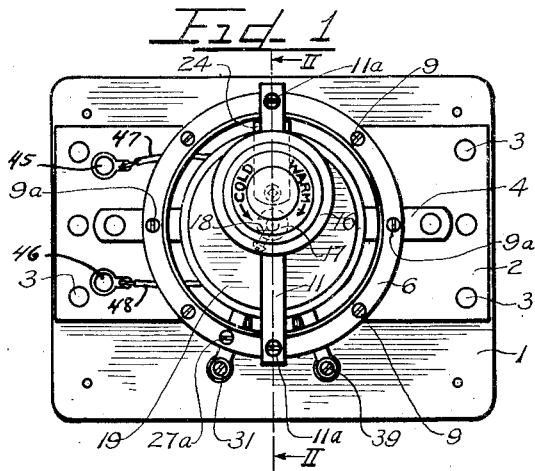
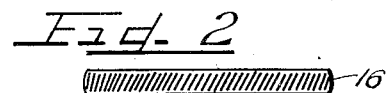
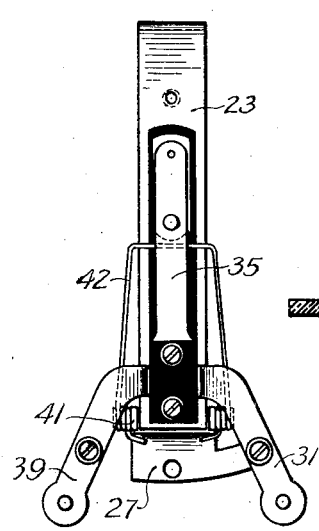
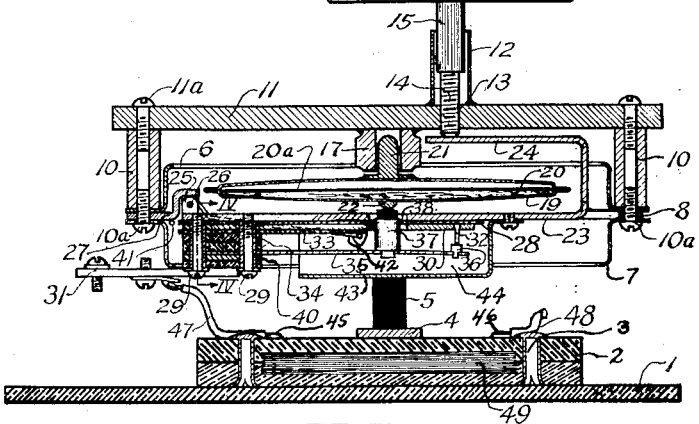
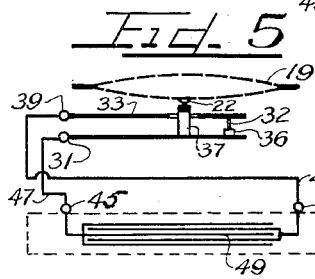
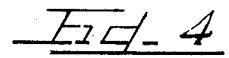
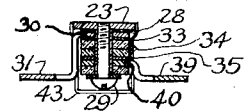
Inventor
Tiodolf Lidberg
by Charles Hill
Attys.

Patented May 5, 1931

1,803,629

UNITED STATES PATENT OFFICE

TIODOLF LIDBERG, OF CHICAGO, ILLINOIS, ASSIGNOR TO CHICAGO SURGICAL & ELECTRICAL CO., A CORPORATION OF ILLINOIS

THERMOSTATIC TEMPERATURE CONTROL

Application filed March 10, 1927. Serial No. 174,134.

This invention relates to improvements in thermostatic temperature controls and the like, and more particularly to a thermostatic constant temperature control for use in an electrical circuit with a heating device in the cultivation of bacteria, which operates at a smaller change in temperature, which provides for a finer adjustment, and which is quicker and more positive in its "make and break" action, than devices of this character heretofore known or developed.

In the cultivation of bacteria, an expensive operation requiring a great amount of time, it is highly essential that the temperature remain constant inasmuch as a few degrees' rise will exterminate the entire culture. Also, in the process of cultivating bacteria several gases are given off, prominent among which is hydrogen. When a device is used which employs a rapidly and continuously operated contact switch or key, it is impossible to eliminate sparking between the contact points of the switch, and there is danger of the sparks causing an explosion by igniting the hydrogen or other gases expelled. Paraffin is also used in the cultivation process, and, when relatively high temperatures are used, some of the paraffin vaporizes and is deposited as a thin film or coating over all immediate objects, and such a deposit on the contact points of the switch would disable, or at least materially detract from the effective operation of the device.

To obviate the above difficulties this invention which is equally adaptable for use in various other circuits, has been developed and has, as an important object, the provision of a thermostatic constant temperature control which operates positively and effectively at an exceedingly small variance in temperature.

Another object of this invention is to provide a constant temperature control which may be adjusted to operate either as to make or break the circuit at any desired temperature.

Still another object of this invention is to provide a thermostatic constant temperature control adaptable for both an extremely fine adjustment or a relatively course adjustment.

A further object of this invention is to provide a thermostatic constant temperature control having protective means associated with the contact points therein to insure against gas ignition or explosions.

A still further object of this invention is to provide a thermostatic constant temperature control adapted for installation in an oven, incubator, or the like, and which has means associated therewith to prevent paraffin coatings from forming on the contact points thereof.

Other and further important objects of this invention will be apparent from the disclosure in the specification and the accompanying drawings.

This invention (in a preferred form) is illustrated in the drawings and hereinafter more fully described.

On the drawings:

Figure 1 is a top plan view of a device embodying principles of this invention.

Figure 2 is a vertical sectional view taken substantially along line II—II of Figure 1.

Figure 3 is a bottom plan view of a unit of the device comprising the switch and the adjustable mounting means therefor.

Figure 4 is a sectional view taken substantially on line IV—IV of Figure 2.

Figure 5 is a wiring diagram of the device with parts not in circuit shown by dotted lines.

As shown on the drawings:

The reference numeral 1 indicates a base plate formed of any suitable material adapted to act as an insulator for both electricity and heat. Secured to this base plate 1 in any desired manner and formed of similar material is a second base plate 2 which is formed of two pieces permanently secured together by rivets 3, or by any other desirable means.

A metallic strip 4 having an interiorly threaded post 5 of insulating material mounted thereon adjacent each end thereof is secured to the base plate 2. Two circular protecting flanges 6 and 7, held in spaced relationship to each other by washers 8, are held together by screws 9 and mounted on posts 5 by screws 9a. A pair of posts 10, each of which has a threaded aperture through its entire length, are mounted on flanges 6 and 7 diametrically opposite each other and held in place by screws 10a. A cross bar 11 is secured to posts 10 by screws 11a.

A tubular member 12 is welded to the cross bar 11 surrounding a threaded aperture 13 therein, which aperture is engaged by a stud bolt 14 having a square or triangular head removably engaged by a socket 15 of corresponding form depending from a hand ring 16. Welded to the underside of cross bar 11 adjacent its center is a collar 17 having a transverse passage 18 therein, and which is provided with the usual set screw. The collar 17 is so positioned that anything slipped through the passage 18 and engaged by the set screw will be held in the exact center of the circular flanges 6 and 7.

In the manner above described a wafer diaphragm 19 partially filled with the usual liquid 20 of low boiling point is removably suspended within the flanges 6 and 7 by the engagement of a stud 21 mounted on the top of the diaphragm 19 with the collar 17. A small knob 22 is provided on the bottom of the diaphragm 19 for a purpose disclosed hereinafter. The diaphragm 19 may be readily replaced by a similar diaphragm containing liquid which vaporizes at a lower or higher temperature as desired.

In a preferred form of diaphragm, a piece of blotting paper 20a or the like, is used therein, which absorbs all the liquid in the diaphragm and remains saturated with the liquid, thereby providing for an equal and uniform expansion of the diaphragm upon vaporization of the liquid, regardless of the position in which the device is mounted.

With reference to Figures 2, 3 and 4, the unit, an electrical contact switch and the adjustable mounting means therefor, disclosed in Figure 3, comprises a strip 23 of stiffened metal angularly bent at one end to provide a horizontally disposed tongue 24 engageable by the stud bolt 14. The other end of the strip 23 is provided with integral upwardly bent lugs 25, apertured to receive and support a shaft 26 therein. An angular member 27 similarly engages the shaft 26 and is secured between the flanges 6 and 7 by screws 10a and 27. Disposed adjacent the underside of the strip 23 is an insulating strip 28 broadened at its rear end and held in position by the screws 29 which are threaded in insulating bushings. Adjacent the insulating strip 28 is a strip 30 formed of metal having good conductivity, one end of which is broadened into a substantially rectangular form by which it is securely held in place by screws 29, and which broadened end has an integral terminal 31 extending therefrom in angular relation thereto, the other end of the strip 30 being provided with a contact point 32 which may be formed of any metal, platinum for instance, capable of withstanding high temperatures. Adjacent the underside of the strip 30 is a strip of insulation 33 shorter but similar to strip 28 and adjacent its expanded end are insulating blocks 34 under which is mounted a resilient strip 35 of spring steel or similar conductive substance which is provided with a contact point 36 engageable with contact point 32, the insulating strip 33, blocks 34 and strip 35 being all secured in place by screws 29. Mounted on the strip 35 is a push button 37 which upwardly extends through apertures 38 provided in the strip members 23, 28 and 30 into engagement with the knob 22 on the bottom of the diaphragm 19. A second extended terminal 39 is provided with an integral angularly related rectangular end 40 which contacts with the strip 35 and is held in place by the screws 29 being insulated therefrom.

Wound on the ends of the shaft 26 is a spring 41 which has an integral extended portion 42 engaging the underside of the insulating strip 33 adjacent push button 37, and which also has two extended ends to resiliently engage with the angular member 27, this spring thereby retaining the tongue 24 of member 23 in constant engagement with the stud bolt 14, and together with the angular member 27 resiliently supports the entire unit shown in Figure 3.

A cover 43 is provided to enclose the contact points 32 and 36 and extends beyond the push button 37, one end of the cover being secured to the strip 23 and its upwardly extending sides 44 resiliently engage the strip 23. This cover which isolates and shields the contact points 32 and 36, effectively prevents any spark occurring therebetween from igniting any hydrogen or other gas which may be developed in the bacteria culture, and also prevents the formation of a paraffin film over the contact points.

Mounted on the upper half of the base plate 2 are contacts 45 and 46, contact 45 being connected by conductor 47 to terminal 31 and contact 46 by conductor 48 to terminal 39. Disposed between the two parts of base plate 2 and effectively hidden therein is a condenser 49 of a plurality of plates, a terminal of which is connected to each of the contacts 45 and 46. This condenser thereby provides a sharp and quick break eliminating an arc between the contact points 32 and 36 thereby preserving the life of said contact points and increasing the effective operation of the whole device.

A wiring diagram of the device is shown in Figure 5, with parts not in circuit shown by dotted lines, illustrating the connections in the device.

In operation a wafer diaphragm containing liquid which will vaporize at any specified or desired temperature is mounted in the device. If the temperature rises to a predetermined point, the diaphragm 19, due to the vapor pressure therein, expands, the knob 22 forces down the push button 37 on the strip 35 thereby causing a break in the circuit by separating contact point 36 from contact point 32. When the temperature drops, due to the break in the circuit, the diaphragm 19 will contract, the member 35 will spring back into former position engaging 36 with contact 32 and the circuit will be again closed. The device will continue its operation in this manner and thereby keep the temperature constant at any predetermined degree. If the device is to operate at a higher temperature the push button 37 may be forced into spaced relationship with the knob 22 by turning the handwheel 16 to force down the member 23 against the spring 41, thereby providing for a greater expansion of the diaphragm before the circuit is broken. In this manner the device may be calibrated with the aid of a thermometer to hold the temperature constant at any desired point, indicating means being placed on the top of the dial 16 as shown in Figure 1, designating the direction in which to turn the handwheel 16 to cause the device to operate at a lower or higher temperature as desired.

From the foregoing it is obvious that I have provided a constant temperature control capable of retaining the temperature constant at any desired degree, which is provided with adjustment means whereby the device may be adjusted to an extremely fine degree or to a relatively coarse degree, and which eliminates the danger of a shock to an operator of the device by having the main electrical unit suspended in a substantially hidden position within the frame of the device, which frame is entirely insulated from the electrical circuit. Moreover, the device is protected from gas explosions due to the sparking therein, is composed of simple parts easily and readily assembled, and is manufactured at a minimum cost.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A thermostatic temperature control responsive to practically all temperature changes and adapted to be mounted within a heated chamber and comprising a base plate, a frame mounted thereon, a wafer diaphragm containing a liquid mounted within said frame, a switch resiliently and adjustably mounted in said frame, adjacent to and operable by said diaphragm, which is not in circuit with said switch, directional indicating means for adjusting said switch relative to said diaphragm, a metallic cover for said switch adapted to prevent gas from being ignited by said switch, and a condenser in circuit with said switch, said condenser being concealed in said base plate.

2. A thermostatic temperature control comprising a frame, a diaphragm fixed to said frame for thermally responsive regional movement, a switch comprising relatively yielding contacts mounted on said frame for control by said diaphragm, and exteriorly accessible means on said frame for adjusting the position of said switch relative to the movable region of said diaphragm without affecting the fixed relation of said contacts.

3. A thermostatic temperature control comprising a frame, a diaphragm fixed to said frame for thermally responsive regional movement, a switch comprising relatively yielding contacts pivotally mounted on said frame for control by said diaphragm, and means for adjusting the position of said switch relative to the movable region of said diaphragm without affecting the fixed relation of said contacts.

4. A thermostatic temperature control comprising a frame, a diaphragm fixed to said frame for thermally responsive regional movement, a bracket pivotally mounted relative to said diaphragm, an electrical switch including complemental contacts in normally fixed pressure of contact engagement on said bracket for separable control by said diaphragm, and means for adjusting the position of said bracket to move said switch relative to said diaphragm for temperature control.

5. A thermostatic temperature control comprising a frame, a diaphragm fixed to said frame for thermally responsive regional movement, a bracket pivotally mounted relative to said diaphragm, an electrical switch including complemental contacts fixed to said bracket for control by said diaphragm, and means for adjusting the pivotal position of said bracket to move said switch relative to said diaphragm for temperature control.

6. A thermostatic temperature control comprising a frame, a diaphragm fixed to said frame for thermally responsive regional movement, a bracket pivotally mounted relative to said diaphragm, an electrical switch including complemental contacts fixed to said bracket for control by said diaphragm, spring means for normally urging said bracket to an extreme position, screw means for adjusting the pivotal position of said bracket against the urge of said spring means to move said switch relative to said diaphragm for effecting temperature control.

7. A thermostatic temperature control comprising a frame, a diaphragm fixed to said frame for thermally responsive regional movement, a bracket movably mounted relative to said diaphragm and normally inaccessible in operative placement of said frame, an electrical switch including complemental contacts fixed to said bracket for control by said diaphragm, exteriorly accessible means for adjusting the position of said bracket to move said switch relative to said diaphragm for temperature control, and means associated with said bracket to enclose said switch for the purpose set forth.

8. A thermostatic temperature control comprising a frame, a diaphragm fixed to said frame for thermally responsive regional movement, a bracket movably mounted relative to said diaphragm, spring means for urging said bracket to an extreme position, an electrical switch including complemental contacts fixed to said bracket for control by said diaphragm, and means for adjusting the position of said bracket against the urge of said spring means to move said switch relative to said diaphragm for temperature control.

In testimony whereof I have hereunto subscribed my name at Chicago, Cook County, Illinois.

TIODOLF LIDBERG.